No. 640,821. Patented Jan. 9, 1900.
J. A. S. SIMONSON.
PNEUMATIC TIRE.
(Application filed May 11, 1899.)
(No Model.)
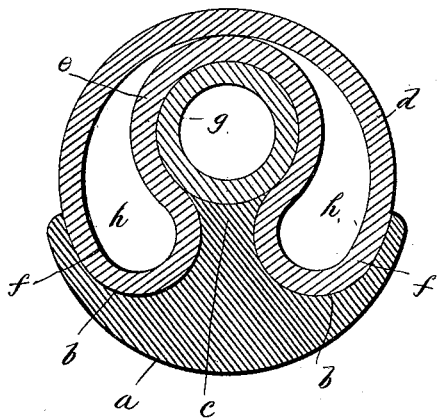
WITNESSES
John Buckler
F. A. Stewart
INVENTOR
Jacob A. S. Simonson
BY
Edgar Tate & Co.
ATTORNEYS

UNITED STATES PATENT OFFICE.

JACOB A. S. SIMONSON, OF NEW YORK, N. Y.

PNEUMATIC TIRE.

SPECIFICATION forming part of Letters Patent No. 640,821, dated January 9, 1900.

Application filed May 11, 1899. Serial No. 716,342. (No model.)

*To all whom it may concern:*

Be it known that I, JACOB A. S. SIMONSON, a citizen of the United States, residing at New York, (Brooklyn,) in the county of Kings and State of New York, have invented certain new and useful Improvements in Pneumatic Tires, of which the following is a full and complete specification, such as will enable those skilled in the art to which it appertains to make and use the same.

This invention relates to compressible and elastic tires for vehicles; and the object thereof is to provide an improved tire of this class which may be used in connection with bicycles or similar vehicles and which may also be made so as to be employed on the wheels of carriages, buggies, and other large vehicles, a further object being to provide a pneumatic tire of this class which does not need to be inflated.

The invention is fully disclosed in the following specification, of which the accompanying drawing forms a part, said drawing being a transverse section of a tire made according to my invention.

In the drawing forming part of this specification I have shown at $a$ the rim of a wheel, with which in practice the spokes are connected, and this rim is provided, on the outer side thereof, with two annular grooves $b$ and a central outwardly-directed annular portion $c$, which separates the grooves $b$ and the outer surface of which is concave in cross-section.

The tire consists of a main outer portion $d$, composed of rubber, rubber and canvas, or any suitable material and consisting of an integral tube the inner perimeter of which is turned or folded inwardly to form an inner tubular portion $e$ and side portions $f$, which rest in the grooves $b$ and closely fit the same.

Placed in the inner tubular portion $e$ is a supplemental central tube $g$, composed of rubber, rubber and canvas, or any suitable material and which rests upon the outwardly-directed central portion $c$ of the rim $a$, as clearly shown in the drawing.

The parts $d$ and $g$ of the tire are preferably much thicker than other tires of this class, so as to give the tire the requisite rigidity, and the spaces $h$ within the outer portion of the tire and the space within the tube $g$ or central portion of the tire are filled with air under normal pressure.

The outer portion $d$ of the tire may be secured to the rim $a$ in any desired manner, and the inner portion $g$ is held in place by the tubular inner fold $e$ and by the outer portion $d$.

When this tire is designed for use upon bicycles and similar vehicles, the parts $d$ and $g$ may be made much thinner, and all that is necessary in order to adapt my improved tire to vehicles of any weight is to correspondingly form the parts $d$ and $g$, so as to give the required stiffness and elasticity to the tire.

Having fully described my invention, I claim as new and desire to secure by Letters Patent—

1. A rim for wheels provided in its outer side with two peripheral grooves, and a central outwardly-directed annular portion, the outer surface of which is concave in cross-section, and a tire composed of a tube, the inner perimeter of which is turned or folded inwardly so as to form side portions which are mounted in said grooves, and a central tubular portion mounted in the outer inner fold of the outer portion and resting on the outwardly-directed central portion of the rim, substantially as shown and described.

2. A rim for wheels provided in its outer side with two peripheral grooves, and a central outwardly-directed annular portion, and a tire composed of a tube, the inner perimeter of which is turned or folded inwardly so as to form side portions which are mounted in said grooves, and a central tubular portion mounted in the outer inner fold of the outer portion and resting on the outwardly-directed central portion of the rim, substantially as shown and described.

In testimony that I claim the foregoing as my invention I have signed my name, in presence of the subscribing witnesses, this 9th day of May, 1899.

JACOB A. S. SIMONSON.

Witnesses:
F. A. STEWART,
C. C. OLSEN.